United States Patent [19]

Manzoni

[11] Patent Number: 4,819,050

[45] Date of Patent: Apr. 4, 1989

[54] ALARM, SECURITY, AND PROTECTION SYSTEM FOR A MOTOR VEHICLE

[75] Inventor: Bernard Manzoni, Saint Claude, France

[73] Assignee: Societe Manzoni-Bouchot, France

[21] Appl. No.: 146,321

[22] Filed: Jan. 20, 1988

[30] Foreign Application Priority Data

Feb. 5, 1987 [FR] France .................. 87 01425
Oct. 9, 1987 [FR] France .................. 87 14003

[51] Int. Cl.$^4$ .............................................. B60R 25/04
[52] U.S. Cl. .................. 340/425.5; 340/430; 340/527; 307/10.2; 180/287
[58] Field of Search .............. 340/64, 63, 65, 52 R, 340/522, 526–528; 307/10 AT; 180/173, 271, 287

[56] References Cited

U.S. PATENT DOCUMENTS

| 4,479,110 | 10/1984 | Cipri | 340/64 |
| 4,645,939 | 2/1987 | Robinson | 340/64 |
| 4,682,062 | 7/1987 | Weinberger | 340/64 |

*Primary Examiner*—Donnie L. Crosland
*Attorney, Agent, or Firm*—Remy J. Van Ophem

[57] ABSTRACT

Electronic disabling circuits are provided to prevent the engine of a motor vehicle to be protected from starting in the event of an attempt at starting the vehicle while the disabling circuits are switched on by a switch. An inhibitor device serves to prevent the disabling circuits from stopping the engine in the event the switch is actuated in an untimely manner while the engine is running. In addition, a detector for detecting the presence of a human being serves, via a circuit, to reliably trigger an alarm in the event of an intrusion, by applying a detection signal to an input of the circuit, assuming the circuits have been switched on by the switch.

16 Claims, 3 Drawing Sheets

Fig. 1

ALARM, SECURITY, AND PROTECTION SYSTEM FOR A MOTOR VEHICLE

BACKGROUND OF THE INVENTION

1. Field of the Invention

The present invention relates to an alarm, security, and protection system for a motor vehicle. The system includes electronic disabling circuits suitable for being selectively switched on by the user in order to disable the operation of a member of the vehicle in the event that an intruder attempts to use it.

2. Description of the Prior Art

Numerous electronic anti-theft protection systems are already known for motor vehicles.

Some systems seek only to trigger an alarm or a signal in the event of an attempt at intrusion into the vehicle. These systems may include detectors for detecting the presence of a human body, e.g. detectors of the volumetric type, for detecting door opening, for detecting removal of accessories such as wheels, or for detecting a break-in (for detecting shock or window-breaking). However, such systems are of limited effectiveness if the vehicle is situated in an isolated location, since the protection system does not prevent the vehicle from being used by an intruder after the alarm, whose operation must be time-limited, has ceased to operate.

Other anti-theft protection systems provide intrusion detection to cause not only an alarm to be triggered, but also to cause the vehicle to be disabled, e.g. by switching off the ignition to the vehicle engine. These more complete systems are nevertheless more complex to implement, and often do not satisfy all of the required conditions of effectiveness or of security for the vehicle user.

In particular, a protection system may be dangerous for the authorized user of the vehicle if the vehicle is running at high speed on the road and the system is actuated, either by the driver, a passenger, or spontaneously due to a technical fault. The erroneous switching on of a vehicle disabling system may cause a serious accident.

The present invention seeks, in particular, to avoid the above-mentioned drawbacks and to provide effective anti-theft protection for a vehicle in complete safety while retaining the advantages of a system that occupies a small volume, that is of limited cost, and whose simple design facilitates its implementation.

SUMMARY OF THE INVENTION

The present invention is an improved alarm, security, and protection system for a motor vehicle, which system includes electronic disabling circuits suitable for being selectively switched on by the user in order to disable operation of a member of the vehicle in the event an intruder attempts to use the vehicle.

The system has a first input terminal connected to receive a D.C. voltage signal when an attempt is made to start the vehicle by acting on the vehicle ignition key, with second and third input terminals interposed on a power supply line to the member to be disabled. A fourth input terminal is connected to a detector for detecting a parameter associated with running of the engine of the vehicle to be protected.

A switch device for switching the disabling circuits on and off by connecting and disconnecting predetermined components of the disabling circuits with ground is also provided.

A first relay including a contact is connected between the second and third input terminals and is normally closed when the relay is at rest. An excitation coil is connected in such a manner as to be selectively powered only when the disabling circuits are ON and a D.C. voltage signal is delivered on the first input terminal.

An inhibitor which is connected to the fourth input terminal is provided. The inhibitor includes first timing means for inhibiting the operation of the disabling circuits should they be switched on while voltage signals representative of a parameter associated with the engine running are being delivered to the fourth input terminal, providing voltage signals have already been applied to the first input terminal for a period of time which is not less than the time constant of the first timing means.

With such a system, failure of some of the circuit components cannot lead to untimely disabling of the vehicle and, in any event, such disabling is impossible once the vehicle is already running under normal conditions.

Additionally, and in order to confuse an unauthorized user of the vehicle, the disabling circuits may be rendered inoperative for a short predetermined duration of time. In this case, the disabling circuits further include second timing means for delaying excitation of the relay coil for a short predetermined period of time after a voltage signal has appeared on the first input terminal when the disabling circuits are ON.

In a particular embodiment, the disabling circuits include a member for controlling the excitation coil, the member being constituted by a first transistor having one of its collector and emitter terminals connected selectively to ground by the switch device and having the other one of its collector and emitter terminals connected to a terminal of the excitation coil. The base of the transistor is controlled by a control signal from the first input terminal which is connected to the other terminal of the excitation coil, the control signal passing at least via a series connection including an inverting gate, a resistor, and a diode.

The inhibitor may include a series connection connected between the fourth input terminal and the common point between the diode and the resistor of the circuit for controlling the first transistor. The series connection is composed of a diode, a pair of resistors, an inverting gate, and a further diode, and the first timing means may include a parallel circuit constituted by a capacitor and a resistor connected to the common point between the pair of resistors.

Advantageously, the protection system in accordance with the invention is further provided with an alarm system which is switched on and off by the switch device connecting specific components of the alarm system to ground and disconnecting them therefrom.

In this case, the alarm system has a fifth terminal for connection to an alarm or signalling member and a sixth terminal for connection to an accessory of the motor vehicle which, when moved, causes a ground potential to be applied to the sixth terminal. A second relay including an excitation coil and a contact connected to the fifth terminal is provided and has an excitation circuit for feeding the excitation coil. An alarm-blocking circuit is also provided to selectively block the excitation circuit. A third timing circuit is connected to the alarm-blocking circuit in order to prevent an alarm from being generated during a predetermined period of time after the alarm system has been switched on by the switch device. A fourth timing circuit is connected between the sixth terminal and the alarm-blocking circuit to prevent an alarm from being generated for a predetermined period of time after the sixth terminal has been grounded. Finally, a fifth timing circuit is incorporated in the alarm-blocking circuit in order to switch off the excitation circuit after it has been in operation for a predetermined length of time.

In a particular embodiment providing a greater degree of protection by means of a system which remains very simple in structure and in operation, the alarm system further includes a seventh terminal for connection to an accessory of the motor vehicle which, when moved, applies a ground potential to the seventh terminal, and a deblocking circuit interposed between the seventh terminal and the alarm-blocking circuit in order to automatically and immediately deblock the blocking circuit when the seventh terminal is grounded.

In order to improve the performance of the system by increasing the sensitivity and the reliability of the alarm system while reducing the risk of untimely alarm system triggering and retaining operating security in the disabling circuits of the alarm and protection system, the alarm and security system for a motor vehicle in accordance with the invention may further include an alarm system which is switcheed on and off by the switch device by connecting specific components thereof to ground and by disconnecting them from ground, and the alarm system may include a fifth terminal for connection to an alarm or signalling member and a sixth terminal for connection to a circuit for detecting the presence of a human being. The circuit has at least one sensor for detecting the presence of a human and is constituted by a passive infrared detector.

In a further embodiment having a simplified disabling circuit and a particularly small number of connection wires to the protection system, the parameter associated with the running of the engine of the vehicle to be protected is constituted by the presence of a D.C. voltage downstream from the contact associated with the vehicle ignition key, and the first and fourth input terminals are constituted by a single terminal.

In this case, the first timing means of the inhibitor connected to the fourth input terminal is connected to a permanent stabilized D.C. power supply voltage source derived from the vehicle battery.

In accordance with the present invention and in order to guarantee that the presence of a human being is reliably detected, the passive infrared detector may be provided with a filter in order to provide a detection signal when it detects variations in infrared radiation which correspond to variations at a frequency lying in a predetermined range of frequencies.

BRIEF DESCRIPTION OF THE DRAWINGS

Embodiments of the invention are described by way of example with reference to the accompanying drawings, in which.

DETAILED DESCRIPTION OF THE PREFERRED EMBODIMENT

Figure 1:
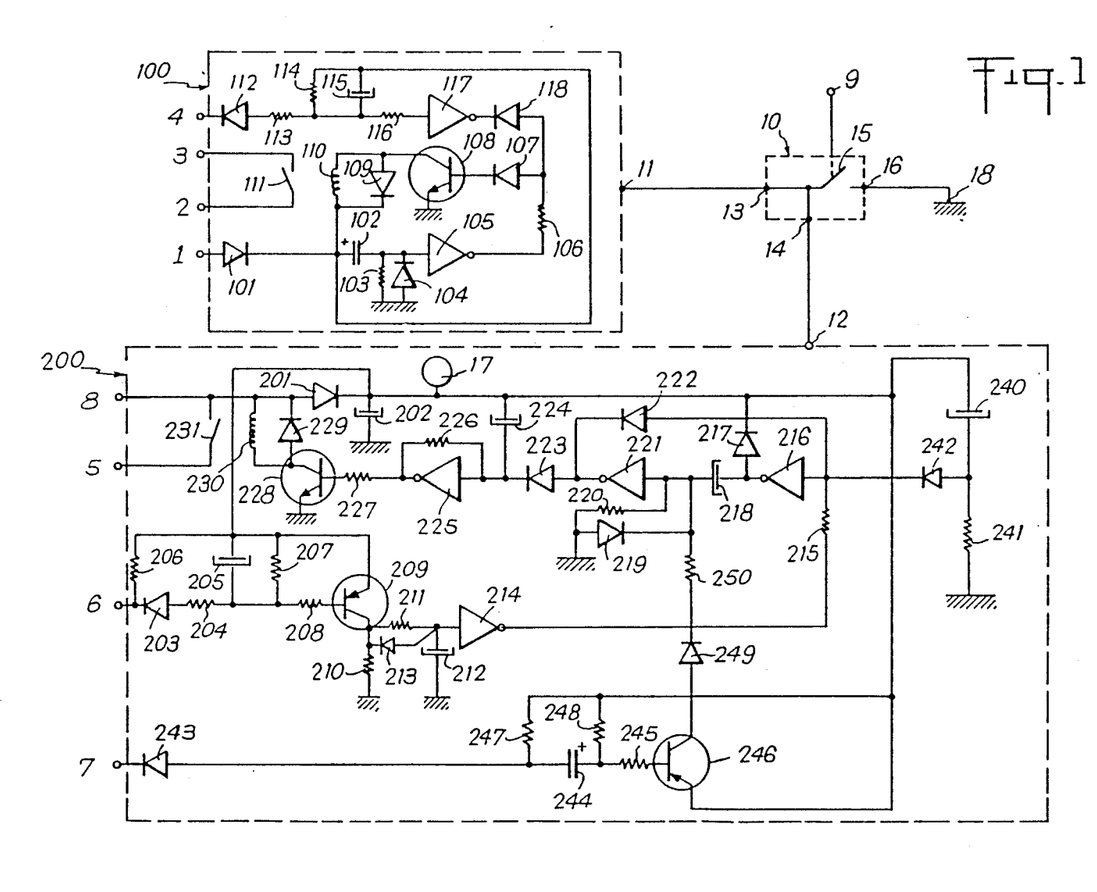
FIG. 1 is a diagram of the alarm and disabling circuits of a first embodiment of a protection system in accordance with the invention.

In FIG. 1, the components constituting the disabling circuits 100 are shown inside a first dashed-line box, the components constituting an alarm system 200 are shown inside a second dashed-line box, and switch means 10 for selectively switching on or off the disabling circuits 100 or the alarm system 200 are shown inside a third dashed-line box.

The switch means 10 include a contact 15 which is capable of being controlled from a conventional remote control device or from a switch which is hidden in the vehicle and which acts on a terminal 9. The contact 15 serves to connect input terminals 13 and 14 of the switch means 10 to a terminal 16 which is permanently connected to a point 18 which, in the vehicle, is suitable for constituting a grounding point. The various points of the disabling circuits 100 which should be connected to ground when the protection system is ON, are connected to a terminal 11 of the disabling circuits 100. Similarly, the various points of the alarm system 200 which should be connected to ground when the protection system is ON, are connected to a terminal 12 of the alarm system 200. The terminals 11 and 12 are connected to input terminals 13 and 14 respectively of the switch means 10 such that actuating the switch means 10 serves to switch the disabling circuits 100 and the alarm system 200 on or off by effectively grounding, or not grounding, the essential components of the protection system via the contacts 15.

Naturally, in an alternate embodiment, the terminal 14 of the switch means 10 could be disconnected from the terminal 13 and be connected to the terminal 16 via an additional contact independent from the contact 15 in order to make it possible to selectively switch on the alarm system 200 independently from switching on the disabling circuits 100.

A description of the disabling circuits 100 follows. These circuits include a first input terminal 1 which may be connected in such a manner as to receive a positive D.C. voltage signal from the vehicle battery when the ignition key is actuated, i.e. each time an attempt is made to start the vehicle. Second and third input terminals 2 and 3 are interposed on a power supply line to the member to be disabled. This may be a line of the engine ignition circuit or any other electrical connection that serves to control a member which is essential for starting the engine. A fourth input terminal 4 is connected to a detector for detecting a parameter associated with the engine of a vehicle actually running and serves to represent normal operating conditions. This parameter may be the oil pressure, for example. The detector must itself be adapted to deliver a positive D.C. voltage signal representative of a logic level "1" when the engine is running and a zero voltage signal representative of a logic level "0" when the engine is stopped or is running at less than normal operating conditions.

The disabling circuits 100 essentially are composed of a relay having a contact 111 which is connected between the input terminals 2 and 3 and which is closed when the relay is at rest, together with an excitation coil 110 having a protective diode 109 connected in parallel therewith. The presence of a normally closed contact 111 guarantees that when the protection system is not in operation, vehicle operation is not disturbed in any way, even in the event of any of the components in the protection system failing.

The excitation coil 110 of the relay has a first end connected to the cathode of a diode 101 whose anode is connected to the terminal 1, and a second end connected to the collector of a control transistor 108 whose emitter is selectively connected to ground via the switch means 10. Here again, any risk of untimely excitation of the relay is avoided since the emitter of the transistor 108 is in a position to conduct only when the protection system is switchd on by the switch means 10.

The transistor 108 is controlled via its base from the input terminal 1 by means of a series circuit constituted by the diode 101, a timing circuit, an inverting gate 105, a resistor 106, and a diode 107.

The timing circuit itself includes a differentiator circuit constituted by a capacitor 102 connected between the diode 101 and the inverting gate 105, together with a parallel circuit constituted by a resistor 103 and a diode 104 connected between the input to the inverting gate 105 and ground. The time constant of the timing circuit is preferably fairly small, being of the order of a few seconds and serving to cause the relay to be excited only after a short delay has elapsed from the appearance of a voltage signal on the terminal 1, thereby increasing the confusion of an unauthorized user of the vehicle.

In order to guarantee that the disabling circuits 100 do not cause an involuntary stoppage of the vehicle engine due to the protection system being switched on at an untimely moment, the disabling circuits 100 include inhibit means for inhibiting control of the relay. The inhibit means are connected between the fourth input terminal 4 and the anode of the diode 107 whose cathode is connected to the base of the transistor 108. The inhibit means include a series circuit constituted by a diode 112 whose cathode is connected to the fourth input terminal 4, two resistors 113 and 116, an inverting gate 117, and a diode 118 whose anode is connected to the anode of the diode 107. In addition, timing means having a parallel circuit constituted by a capacitor 115 and a resistor 114 are connected between the point common to the resistors 113 and 116, and the point where the diode 101 and the capacitor 102 are connected to the excitation coil 110 of the relay. The timing means including the resistor 114 and the capacitor 115 has a time constant which is much greater than that of the timing circuit including the capacitor 102, the resistor 103, and the diode 104. For example, this time constant may be about 60 seconds. The timing means including the resistor 114 and the capacitor 115 is intended to prevent the triggering of the relay from being inhibited when the vehicle is manifestly no longer in normal operation and is, thus, specifically in need of protection against any attempts at using it, as applies in particular during a short period of time after a voltage signal has appeared on the terminal 1. In theory, any unauthorized attempt at using the vehicle should cause the relay to be excited, thereby preventing any prolonged running of the vehicle engine, such that during the period of time for which the timing means is operative to prevent the inhibit means from acting, no signal representative of logic level "1" should appear on the fourth input terminal 4. However, the presence of the timing means constitutes an additional security measure which guarantees reliability of the disabling circuits 100 on starting, even if the signals delivered to the fourth input terminal 4 are erroneous.

The disabling circuits 100 operate as follows. When the disabling circuits are switched off by the contact 15 of the switch means 10, the emitter of the transistor 108 is disconnected from ground and as a result the relay cannot be excited. After the contact 15 has been closed, the transistor 108 can become conductive providing a positive voltage signal is applied to the terminal 1 for a period of time which is longer than the time constant of the timing circuit, i.e. for a period of time which is greater than the time required for charging the capacitor 102. However, if a period of time greater than the time constant of the timing means has elapsed and if a high level signal is applied to the fourth input terminal 4, which corresponds to the vehicle being under normal operating conditions, a logic level "0" is present at the output from the inverting gate 117, and the transistor 108 can no longer be switched to the conducting state, regardless of the level of the signal applied at the output from the inverting gate 105. As a result, the disabling means constituted by the transistor 108 and the relay including the excitation coil 110 and the contact 111 are, indeed, inhibited.

A description of the alarm system 200 which may be implemented in parallel with the disabling circuits 100 in order to increase the dissuasive nature of the protection system follows.

The alarm system 200 includes a terminal 5 for connection to an alarm or signalling member (not shown in the drawing), a terminal 6 for connection to an accessory of the motor vehicle (which is preferably the driver door) such that opening the accessory grounds the terminal 6, a terminal 7 for connection to another accessory of the motor vehicle (which may be the engine hood, the trunk, or one of the passenger doors) such that opening the accessor grounds the terminal 7, and a terminal 8 for connection to a permanent positive D.C. voltage feed, e.g. the vehicle battery or a self-contained power supply for the protection system.

The alarm system 200 includes a relay having an excitation coil 230 and a contact 231 which is connected to the terminal 5 and which may be interposed, for example, between the terminals 5 and 8 in order to feed electricity selectively to the alarm or signalling member. The excitation coil 230 is connected in parallel with a protection diode 229 and is connected between the power supply terminal 8 and the collector of a transistor 228 whose emitter is connected to ground when the contact 15 of the switch means 10 is closed. A positive power supply line or rail 17 for feeding the circuits of the alarm system 200- is connected to the terminal 8 via a conventional voltage stabilizer circuit including a diode 201 and a capacitor 202.

The transistor 228 excites the excitation coil 230 of the relay when switched into the conductive state by control circuits which can operate only when at least one of the terminals 6 and 7 is connected to ground by the associated vehicle component being opened.

Control by means of the terminal 6 is considered first. A control circuit including components 203 to 215 delivers a lower level signal to the input of a blocking circuit constituted by components 216 to 223 after a predetermined time has elapsed from the terminal 6 being grounded, and providing that the alarm system 200 has itself already been switched on by the switch means 10 for a period of time which is greater than the time constant of an exit timing circuit constituted by a capacitor 240, a resistor 241, and a diode 242 and intended to allow an authorized user of the vehicle to keep the driver door open for a certain period of time, e.g. about 30 seconds, after the alarm system 200 has been switched on and without the resulting ground of the terminal 6 triggering an alarm.

Once a low level signal has been applied by the control circuit 203 to 215 to the blocking circuit 216 to 223, this circuit allows an oscillator circuit 224 to 227 interposed between itself and the base of the transistor 228 to operate for a predetermined duration, for example several tens of seconds. When the oscillator circuit 224 to 227 is allowed to operate, the transistor 228 is switched on and off at the oscillator frequency which may be about 1 hertz, for example, thereby pulsing the excitation coil 230 of the relay.

The oscillator circuit 224 to 227 is very simple in structure since it is essentially constituted by a capacitor 224 connected between the positive power supply line 17 and the output from the blocking circuit 216 to 223, together with a single inverting gate 225. The input of the inverting gate 225 is connected to the output of the blocking circuit 216 to 223, while the output of the inverting gate 225 is connected via a resistor 227 to the base of the transistor 228. In addition, a resistor 226 is connected in parallel with the inverting gate 225.

The blocking circuit 261 to 223 includes the following components in series: a first inverting gate 216; a capacitor 218; a second inverting gate 221; and a diode 223. In addition, a diode 222 is connected in parallel between the input to the first inverting gate 216 and the output from the second inverting gate 221. Also, the anode of a diode 217 is connected to the output from the first inverting gate 216 and the cathode of the diode 217 is connected to the power supply line 17. The common point between the capacitor 218 and the input to the second inverting gate 221 is also connected to ground by a parallel circuit constituted by a resistor 220 and a diode 219 in order to constitute, together with the capacitor 218, a timing circuit which controls the duration for which the oscillator circuit 224 to 227 is allowed to oscillate by the blocking circuit 216 to 223 after a low level signal has appeared at the input to the blocking circuit.

The control circuit 203 to 215 includes a transistor 209 whose emitter is connected to the power supply line 17 and whose collector is connected to ground via a resistor 210. The base of the transistor 209 is connected to the terminal 6 via a series connection of two resistors 208 and 204 and a diode 203. A resistor 206 is connected between the power supply line 17 and the terminal 6, and a parallel circuit having a capacitor 205 and a resistor 207 is connected between the power supply line 17 and the common point between the resistors 204 and 208. The circuit including the capacitor 205 and the resistor 207 constitutes an entry timing circuit having a time constant of about 10 to 15 seconds, for example, and is intended to prevent the relay from being activated for a short period of time following the opening of the drive door in order to allow an authorized user of the vehicle time to switch off the alarm system 200 by means of the switch means 10 before the alarm has been triggered.

The collector of the transistor 209 is connected to the input of an inverting gate 214 via a resistor 211 and a diode 213 connected in parallel. A capacitor 212 is also connected between the input of the inverting gate 214 and ground, and a link resistor 215 connects the output of the inverting gate 214 to the input of the inverting gate 216.

The relay is controlled from the terminal 6 as follows. So long as the terminal 6 is not connected to ground, the transistor 209 remains OFF and a logic level "1" signal is applied to the input of the inverting gate 216 of the blocking circuit. This signal is transmitted by the diodes 222 and 223 to the input of the oscillator circuit 224 to 227 and prevents the oscillator circuit from oscillating. The transistor 228 remains OFF.

When the terminal 6 is connected to ground, the capacitor 205 charges for a predetermined duration corresponding to the time constant of the input timing circuit having the capacitor 205 and the resistor 207, and when the predetermined duration expires the transistor 209 is switched ON, thereby applying a logic level "0" to the input of the inverting gate 216 and to the anode of the diode 222. A logic level "0" is then likewise applied to the anode of the diode 223 so long as the capacitor 218 has not charged, thereby leaving the oscillator free to oscillate and, thus, periodically switching ON the transistor 228. At the end of the time constant of the timing circuit, the capacitor 218 is charged and reapplies a logic level "1" to the anode of the diode 223, thereby blocking the oscillator and preventing the alarm system from operating.

As explained below, the blocking of the oscillator circuit 224 to 227 by the blocking circuit 216 to 223 is not final, and grounding the input terminal 7 to the alarm system, by opening a member such as a hood or a door other than the driver door, allows the alarm to be retriggered by automatically deblocking the blocking circuit 216 to 223.

The input terminal 7 is connected via a series connection of a diode 243, a capacitor 244, and a resistor 245 to the base of a transistor 246 whose emitter is connected to the power supply line 17 and whose collector is connected via a series connection of a diode 249 and a link resistor 250 to the common point between the capacitor 218 and the input to the inverting gate 221. Two resistors 247 and 248 each have one terminal connected to the power supply line 17 and their opposite terminals are connected to respective sides of the capacitor 244.

The control circuit connected to the input terminal 7 operates as follows. When the input terminal 7 is grounded, the previously OFF transistor 246 is switched ON for a short period of time, thereby discharging the capacitor 218 in the event that it has previously been charged by a previous triggering of the alarm, in particular by the terminal 6 being grounded.

The oscillator circuit 224 to 227 is the again free to oscillate until the capacitor 218 has recharged which requires the predetermined holding duration of the blocking circuit 216 to 223. A single blocking circuit 216 to 223 can, thus, be used with control circuits connected to two different terminals 6 and 7 and is capable of operating reliably in each case.

Figure 2:
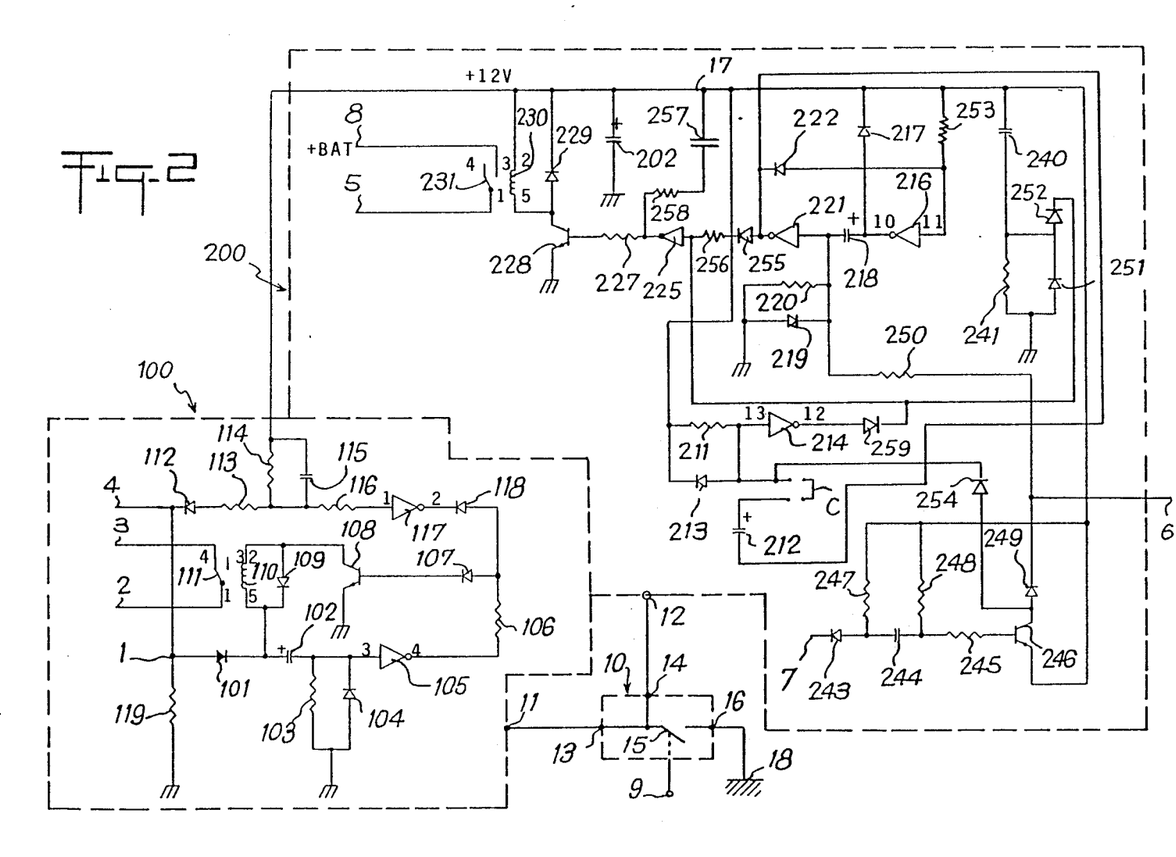
FIG. 2 is a diagram of the main disabling and alarm circuits of a second embodiment of a protection system in accordance with the invention.

FIG. 2 shows an alternate embodiment of the system described above with reference to FIG. 1. Items which are common to FIGS. 1 and 2 have the same reference numerals and are, therefore, not described again. Only the additional features are described specifically.

The FIG. 2 embodiment is a simplified version in which fewer connection wires are required, and in this embodiment the terminals 1 and 4 of the disabling circuits 100 are combined to constitute a single terminal with the terminal 4 and the terminal 1 being connected to a point in the electrical circuit of the vehicle located downstream from the ignition key, such that the parameter indicative of the engine running is constituted in this case by the supply of a positive D.C. voltage signal from the vehicle battery when the ignition key has been operated. As appears from the description below, this simplified embodiment has all the reliability that is desirable from the safety point of view.

The timing means of the disabling circuits 100 of the embodiment of FIG. 2 include the parallel circuit constituted by the capacitor 115 and the resistor 114 which has one end connected to the common point between the resistors 113 and 116 and which has its other end connected to a stabilized power supply line on which a positive power supply voltage (+12 V) derived from the vehicle battery (FIG. 4) is permanently available. The timing means including the resistor 114 and the capacitor 115 has a much greater time consant than the timing circuit which includes the capacitor, resistor, and diode, 102, 103, and 104, respectively. For example, the longer time constant may be about 60 seconds. The timing means is intended to prevent the triggering of the relay including the excitation coil 110 and contact 111 from being inhibited when the vehicle is manifestly no longer in normal operation and is specifically in need of being protected against any attempt at use, as is the case for a short period of time after a voltage signal has appeeared on terminals 1 and 4. Thus, any unauthorized attempt at using the vehicle causes the relay to be excited and prevents any prolonged running of the vehicle engine during the period of time in which the timing means is operative to prevent the inhibit means from acting. Although a level "1" signal appears on the terminal 4 at the same time as it appears on the terminal 1, the presence of the timing means constitutes an additional security measure which guarantees that the disabling circuits 100 operate reliably when the engine is started.

The overall operation of the disabling circuits 100 is the same in both the FIG. 1 and the FIG. 2 embodiments and is, therefore, not described again. In any event, the disabling means constituted by the transistor 108, the excitation coil 110 and the contact 111 is, indeed, inhibited even if the disabling circuits 100 are switched ON in an untimely manner while the vehicle is running.

The alarm system 200 illustrated in FIG. 2 is slightly different from that shown in FIG. 1 insofar as it includes: a terminal 5 for connection to an alarm or signalling member (not shown in the drawing); a terminal 6 for connection, not to an accessory of the vehicle, but to a device 300 for detecting the presence of a human being (FIG. 3), which device delivers a logic level "1" signal to the terminal 6 when it detects a human; a terminal 7 for connection to an accessory of the motor vehicle, e.g. an engine hood, or a door (for people or for goods), such that opening the accessory causes the terminal 7 to be grounded; and a terminal 8 for connection to a permanent positive D.C. power supply which may be the vehicle battery or which may be a self-contained power supply for the protection system.

The alarm system 200 includes a relay together with a protection diode 229 which cooperates with a transistor 228 as shown in the FIG. 1 circuit.

The transistor 228 excites the coil 230 of the relay when it is switched ON by the control circuits which can only operate while the terminal 6 receives a logic level "1" signal as produced by the human detector device 300 when excited, or else while the terminal 7 is grounded by opening the corresponding part of the vehicle, such as the door, hood, etc.

The terminal 6 is connected via a resistor 250 to the input of an inverting gate 221 whose output is connected to the anode of a diode 255 whose cathode is connected via a resistor 256 to the input of an inverting gate 225 whose output is connected via a resistor 227 to the base of the transistor 228. The series circuit constituted by a capacitor 257 and a resistor 258 is connected between the lie 17 and the output from the inverting gate 225.

A resistor 220 is connected between ground and the common point between the resistor 250 and the inputs to the inverting gate 221. A diode 219 has its anode grounded and is connected in parallel with the resistor 220.

A capacitor 218 is connected between the input to the inverting gate 221 and the output from an inverting gate 216 whose input is connected via a resistor 253 to the line 17. A diode 217 has its cathode connected to the line 17 and its anode connected to the output of the inverting gate 216.

An exit timing circuit includes a capacitor 240 and a resistor 241 connected in series between the line 17 and ground together with diodes 251 and 252. The cathode of the diode 251 and the anode of the diode 252 are connected to the common point between the capacitor 240 and the resistor 241. The anode of the diode 251 is connected to ground and the cathode of the diode 252 is also connected to the cathode of a diode 259 whose anode is connected to the output of an inverting gate 214 whose input is connected to the lien 17 via a resistor 211. A diode 213 is connected in parallel with the resistor 211 having its cathode connected to the line 17. The input to the gate 214 is connected via a removable strap C to a capacitor 212 whose other plate is connected to the output from the gate 221. The input to the gate 214 is also connected to the cathode of a diode 254 whose anode is connected to the collector of a transistor 246.

The components 243 to 250 of the circuit connected to the terminal 7 have already been described with reference to FIG. 1 and have exactly the same structure and operate in the same way as the circuit of FIG. 2.

Thus, when the terminal 7 is grounded, the transistor 246 which was previously OFF is switched ON for a short period of time, thereby discharging the capacitor 218 in the event that it had been charged during an earlier triggering of the alarm. The transistor 228 can then be switched ON again until the capacitor 218 has recharged which requires the predetermined holding duration of the blocking circuit 216 to 222. A single blocking circuit 216 to 222 can thus be used together with control circuits connected to two different terminals 6 and 7 and is capable of operating reliably in each case.

From the moment that the terminal 7 is grounded or from the moment that a high level signal ceases to be emitted on the terminal 6, the blocking circuit 216 to 222 maintains an alarm controlling signal on the transistor 228 for a period of time which is predetermined by the capacitor 218 and the resistor 220, and this period may be about 30 seconds, for example, from the moment that the terminal 7 is grounded or after the end of a high level signal being emitted on the terminal 6.

The circuit including the capacitor 240, the resistor 241, and the diodes 251 and 252 constitutes an exit timing circuit which serves to inhibit the alarm system 200 for a predetermined period of time, for example about 30 seconds, after the alarm system 200 has been switched on by the switch means 10. This is to enable an authorized user of the vehicle to remain present during the predetermined period of time after switching on the alarm system 200 and without triggering the alarm even if a detection signal is present on the terminal 6 or the terminal 7 which would normally trigger the alarm.

When the strap C is present, the circuit including the resistor 211 and the capacitor 212 constitutes an entry timing circuit with a time constant of about 10 to 15 seconds, for example, which is intended to prevent the relay from being switched on for a short period of time after the beginning of excitation of the human detector device 300 in order to enable the authorized user of the vehicle to switch off the alarm system 200 by acting on the switch means 10 before the alarm has time to be triggered. However, if so desired, this time delay can be eliminated simply by disconnecting the strap C which connects the capacitor 212 to the input of the inverting gate 214. In this case, the alarm is triggered as soon as a high level signal appears on the terminal 6.

In the event of a high level signal appearing on the terminal 6 due to a sensor 20 (FIG. 3) detecting the presence of a human in the vehicle, operation is as follows:

If the alarm system has just been switched on by the user who is being detected by the sensor 20, a logic level "1" is maintained by the diode 252 at the input to the inverting gate 225 for the time required to charge the capacitor 240, i.e. for the time constant of the exit timer circuit. The transistor 228, therefore, remains OFF. In contrast, after the exit time delay has elapsed, a logic level "0" is applied to the anode of the diode 252. If a logic level "0" signal is then present on the terminal 6 because the infrared sensor 20 is not excited, and if the terminal 7 is not grounded either, then the output from the inverting gate 221 and the input to the inverting gate 225 are at logic level "1". The output from the inverting gate 225 is thus maintained at a zero potential which keeps the transistor 228 switched off.

However, if a logic level "1" signal appears on the terminal 6 because the infrared sensor 20 is excited, then a logic level "0" signal appears at the output from the inverting gate 221, and as a result the diode 222 and the inverting gate 216 serve to latch this alarm condition. The logic level "0" signal at the output from the inverting gate 221 causes the logic level "1" signal at the input to the inverting gate 225 to disappear, thereby switching on the transistor 228 and powering the coil 230 of the relay which may control an electronic siren, for example.

After the logic level "1" signal at the terminal 6 has disappeared, the alarm is maintained for a period of time which is determined by the time constant of the circuit including the capacitor 218 and the resistor 220. At the end of the alarm, the alarm system 200 is ready to operate again by switching on the transistor 228 as soon as a new logic level "1" signal appears on the terminal 6 or as soon as the terminal 7 is grounded.

Figure 3:
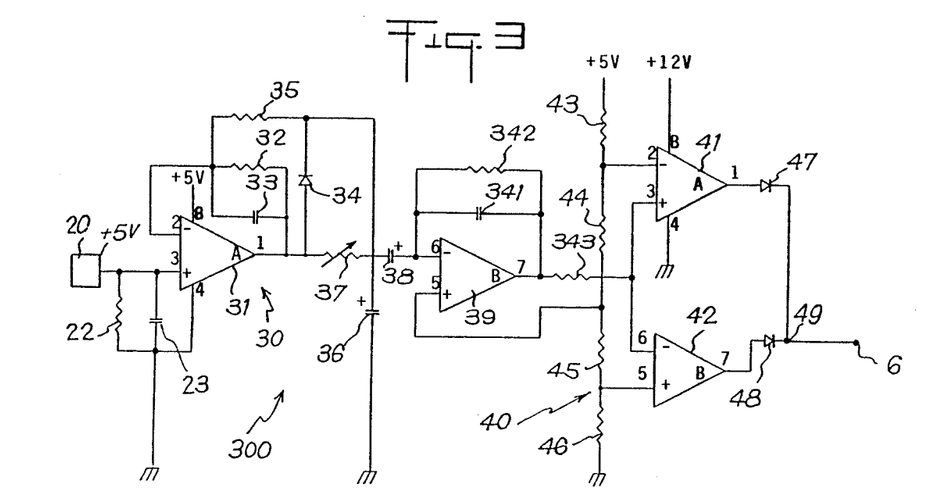
FIG. 3 is a diagram of a circuit for shaping the signals delivered by a human presence detector for the protection system of FIG. 2.

A description with reference to FIG. 3 of a device for detecting the presence of a human follows. The device is connected to the terminal 6 of the FIG. 2 alarm system 200 in order to trigger an alarm when an intruder penetrates into the motor vehicle which is under protection.

The FIG. 3 detector device is essentially constituted by a passive infrared type human sensor 20 which is advantageously provided with filter means in order to provide a detection signal when variations in infrared radiation are detected which correspond to variations at a frequency lying in a predetermined frequency range. As a result, the sensor is insensitive to slow variations in temperature and is also incapable of generating false alarms due to shocks, vibrations, or the displacement of objects, all of which may give rise to false alarms with volumetric type detectors, for example.

Passive infrared human detectors satisfying the conditions required for reliable detection in the context of the present invention while occupying little space and being relatively cheap may be constituted, for example, by the Siemens sensor reference number LHI954 or by the RTC sensor reference RTC RPY97, Siemens and RTC being registered trademarks.

The signal-shaping circuits of the device for detecting the presence of a human 300 for shaping the signal from the passive infrared sensor 20 are shown in FIG. 3.

The passive infrared sensor 20 includes a photodiode having one terminal connected to a stabilized power supply of +5 volts, the diode being sensitive to the infrared radiation emitted by any person or animal attempting to penetrate into the vehicle. The photodiode becomes conductive when it receives such infrared radiation. Any activation of the sensor 20 causes a signal to be applied to the noninverting input of a comparator circuit 30, which noninverting input is also connected to ground via a parallel circuit constituted by a resistor 22 and a capacitor 23 which acts as a filter for fast transient signals. The threshold comparator circuit 30 is essentially constituted by an operational amplifier 31 whose noninverting input is connected to the sensor 20 and whose inverting input is connected to ground via a resistor 35 and a capacitor 36 connected in series. A diode 34 has its anode connected to the output from the operational amplifier 31 and has its cathode connected to the common point between the resistor 35 and the capacitor 36. A parallel connection of a resistor 32 and a capacitor 33 is additionally connected between the inverting input and the output of the operational amplifier 31.

When a signal is applied to the noninverting input of the operational amplifier 31 because the sensor 20 has detected infrared radiation, a time varying output signal is present at the output from the operational amplifier 31 and this signal is transmitted via an adjustable resistor 37 and a link capacitor 38 to the inverting input of a second operational amplifier 39. The adjustable resistor 37 serves to adjust the detection sensitivity of the passive infrared sensor 20 when the circuit is being set up.

Together with two other operational amplifiers 41 and 42, the operational amplifier constitutes a circuit 40 for shaping the signals transmitted by the capacitor 38. A parallel connection of a resistor 342 and a capacitor 341 is connected between the inverting input and the output of the operational amplifier 39, which ouptut is connected via a resistor 343 to the noninverting input of the operational amplifier 41 and to the inverting input of the operational amplifier 42. The inverting input of the operational amplifier 41 is connected to the stabilized +5 volt power supply via a resistor 43 and to the noninverting input of the operational amplifier 39 via a resistor 44, and in symmetrical manner the noninverting input of the operational amplifier 42 is connected to ground via a resistor 46 and to the noninverting input of the operational amplifier 39 via a resistor 45. The outputs from the operational amplifiers 41 and 42 are connected via respective diodes 47 and 48 to a common point 49 at which a signal appears when the sensor 20 is activated. The common point 49 is connected to the above-mentioned terminal 6.

Figure 4:
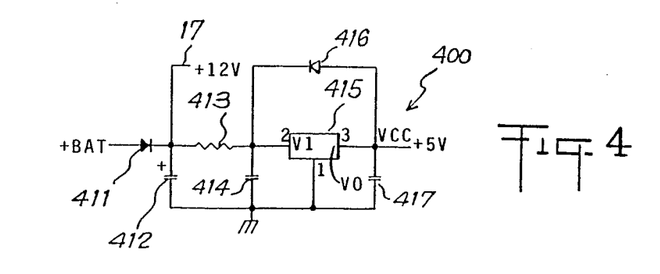
FIG. 4 is a diagram of the circuits for feeding power to the protection system of FIGS. 2 and 3 from the battery of a motor vehicle.

FIG. 4 shows a conventional power supply circuit which may be used in combination with the circuits of FIGS. 1 to 3. Thus, a stabilized +12 volt power supply voltage may be taken by a line 17 from the permanently available battery voltage +BAT via a first rectifying filter circuit having a diode 411 and a capacitor 412.

A stabilized voltage for powering integrated circuits, e.g. at +5 volts, may additionally be provided on a line 18 from the stabilized +12 volt voltage by means of a voltage regulator circuit 415 whose input is connected via a resistor 413 to the common point between the diode 411 and the capacitor 412. In addition, a diode 416 has its anode connected to the output from the regulator circuit 415 and its cathode connected to the input of the regulator circuit 415, and the input and output of the regulator circuit are also connected to ground via respective capacitors 414 and 417.

It will be apparent to those skilled in the art to which this invention appertains, that the above described preferred embodiment may be subject to change or modification. Such changes or modifications can be carried out without departing from the scope of the invention, which is intended to be limited only the scope of the appended claims.

What is claimed is:

1. An alarm, security, and protection system for a motor vehicle, the system comprising electronic disabling circuits suitable for being selectively switched on by the user in order to disable operation of a member of the vehicle in the event of an intruder attempting to use the vehicle, said system comprising:
    a first input terminal connected to receive a D.C. voltage signal when an attempt is made to start the vehicle by acting on the vehicle ignition key;
    second and third input terminals interposed on a power supply line to the member to be disabled;
    a fourth terminal connected to a detector for detecting a parameter associated with the running of the engine of the vehicle to be protected;
    switch means for switching the disabling circuits on and off by connecting and disconnecting determined components of the disabling circuits with ground;
    a first relay including a contact connected between said second and third input terminals, said contact being normally closed when the relay is at rest, and an excitation coil connected in such a manner as to be selectively powered only when the disabling circuits are ON and a D.C. voltage signal is delivered on the first input terminal; and
    inhibitor means connected to the fourth input terminal and comprising first timing means for inhibiting the operation of the disabling circuits should they be switched on while voltage signals representative of a parameter associated with the engine running are being delivered to the fourth input terminal, and providing voltage signals have already been applied to the first input terminal for a period of time which is not less than the time constant of said first timing means.

2. A protection system according to claim 1, wherein the disabling circuits include a member for controlling the excitation coil, said member being constituted by a first transistor having one of its collector and emitter terminals connected selectively to ground by said switch means and having the other one of its collector and emitter terminals connected to a terminal of the excitation coil, with the base of said transistor being controlled by a control signal from said first input terminal which is connected to the other terminal of the excitation coil, said control signal passing at least via a series connection comprising an inverting gate, a resistor, and a diode.

3. A protection system according to claim 2, wherein the disabling circuits further include second timing means for delaying excitation of the relay coil for a short predetermined period of time after a voltage signal has appeared on the first input terminal when the disabling circuits are ON.

4. A protection system according to claim 2, wherein the inhibitor means comprise a series connection connected between said fourth input terminal and the common point between the diode and the resistor of the circuit for controlling the first transistor, said series connection comprising a diode, a pair of resistors, an inverting gate, and a further diode, and wherein the first timing means comprise a parallel circuit constituted by a capacitor and a resistor connected to the common point between said pair of resistors.

5. A protection system according to claim 1, further comprising an alarm system which is switched on and off by said switch means connecting specific components of the alarm system to ground and disconnecting them therefrom.

6. A protection system according to claim 5, wherein the alarm system comprises:
    a fifth terminal for connection to an alarm or signalling member;
    a sixth terminal for connection to an accessory of the motor vehicle which, when moved, causes a ground potential to be applied to said sixth terminal;
    a second relay including an excitation coil and a contact connected to the fifth terminal;
    an excitation circuit for feeding said excitation coil;
    an alarm-blocking circuit for selectively blocking the excitation circuit;
    a third timing circuit connected to the alarm-blocking circuit in order to prevent an alarm from being generated during a predetermined period of time after the alarm system has been switched on by the switch means;
    a fourth timing circuit connected between said sixth terminal and the alarm-blocking circuit to prevent an alarm from being generated for a predetermined period of time after the sixth terminal has been grounded; and
    a fifth timing circuit incorporated in the alarm-blocking circuit in order to switch off the excitation circuit after it has been operation for a predetermined period of time.

7. A protection system according to claim 6, wherein the alarm system further includes a seventh terminal for connection to an accessory of the motor vehicle which, when moved, applies a ground potential to said seventh terminal, and a deblocking circuit interposed between the seventh terminal and the alarm-blocking circuit in order to automatically and immediately deblock the blocking circuit when the seventh terminal is grounded.

8. A protection system according to claim 6, wherein the excitation circuit for powering the excitation coil comprises a capacitor, a single inverter gate, resistors, and a transistor.

9. A protection system according to claim 6, wherein the alarm-blocking circuit comprises at least one first inverting gate, a timing circuit, a second inverting gate, and a diode, all connected between the fourth timing circuit and the excitation circuit.

10. A protection system according to claim 7, wherein the alarm-blocking circuit comprises at least one first inverting gate, a timing circuit, a second inverting gate, and a diode, all connected between the fourth timing circuit and the excitation circuit, and wherein the deblocking circuit comprises at least one transistor, a capacitor, resistors, and diodes, and is connected to the alarm-blocking circuit between said timing circuit thereof and said second inverter gate thereof.

11. A protection system according to claim 5, wherein the switch means for switching the disabling circuits and the alarm system on and off are remotely controlled.

12. A protection system according to claim 1, wherein said fourth input terminal is connected to a sensor for detecting the oil pressure in the engine of the vehicle to be protected.

13. A protection system according to claim 1, wherein said system further includes an alarm system which is switched on and off by said switch means by connecting specific components thereof to ground and by disconnecting them from ground, and wherein the alarm system comprises a fifth terminal for connection to an alarm or signalling member and a sixth terminal for connection to a circuit for detecting the presence of a human being, said circuit comprising at least one sensor for detecting the presence of a human and constituted by a passive infrared detector.

14. A protection system according to claim 13, wherein the parameter associated with the running of the engine of the vehicle to be protected is constituted by the presence of a D.C. voltage downstream from the contact associated with the vehicle ignition key, and wherein said first and fourth input terminals are constituted by a single terminal.

15. A protection system according to claim 14, wherein the first timing means of the inhibitor means connected to the fourth input terminal is connected to a permanent stabilized D.C. power supply voltage source derived from the vehicle battery.

16. A protection system according to claim 13, wherein the passive infrared detector is provided with filter means in order to provide a detection signal when it detects variations in infrared radiation which corresponds to variations at a frequency lying in a predetermined range of frequencies.

* * * * *

UNITED STATES PATENT AND TRADEMARK OFFICE
CERTIFICATE OF CORRECTION

PATENT NO. : 4,819,050
DATED : April 4, 1989
INVENTOR(S) : Bernard Manzoni

It is certified that error appears in the above-identified patent and that said Letters Patent is hereby corrected as shown below:

Column 3, line 29, delete "switcheed" and insert ---- switched ----.

Column 6, line 53, delete "200-" and insert ---- 200 ----.

Column 10, line 33, delete "lien" and insert ---- line ----.

Signed and Sealed this

Twenty-second Day of May, 1990

Attest:

HARRY F. MANBECK, JR.

*Attesting Officer*     Commissioner of Patents and Trademarks